United States Patent
Yang et al.

(10) Patent No.: US 8,436,262 B2
(45) Date of Patent: May 7, 2013

(54) DETECTING METHOD FOR TOUCH PANEL

(75) Inventors: Chun-Wei Yang, Hsin-Chu (TW); Yu-Min Hsu, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 572 days.

(21) Appl. No.: 12/568,995

(22) Filed: Sep. 29, 2009

(65) Prior Publication Data

US 2010/0079397 A1 Apr. 1, 2010

(30) Foreign Application Priority Data

Sep. 30, 2008 (TW) .............................. 97137944 A (51) Int. Cl.
*G06F 3/00* (2006.01)
(52) U.S. Cl.
USPC ........................ 178/18.01; 345/173
(58) Field of Classification Search .................. None
See application file for complete search history.

(56) References Cited

U.S. PATENT DOCUMENTS

| | | | |
|---|---|---|---|
| 7,295,191 B2 | 11/2007 | Kraus et al. | |
| 7,952,563 B2 | 5/2011 | Park et al. | |
| 2003/0189552 A1 | 10/2003 | Chuang et al. | |
| 2006/0097991 A1 | 5/2006 | Hotelling et al. | |
| 2006/0152499 A1 | 7/2006 | Roberts | |
| 2007/0268273 A1 | 11/2007 | Westerman et al. | |
| 2009/0184934 A1 | 7/2009 | Lin et al. | |
| 2011/0037727 A1* | 2/2011 | Lee et al. ...................... 345/174 |

FOREIGN PATENT DOCUMENTS

| | | |
|---|---|---|
| CN | 1635541 | 7/2005 |
| JP | 2004-227233 | 8/2004 |
| TW | 200634635 | 10/2006 |
| TW | 200703083 | 1/2007 |
| TW | 200933454 | 8/2009 |

OTHER PUBLICATIONS

Chinese language office action dated Sep. 4, 2009.
English language translation of abstract of CN 1635541 (published Jul. 6, 2005).
Chinese language office action dated Mar. 9, 2010.
English language translation of abstract of JP 2004-227233 (published Aug. 12, 2004).
Taiwan office action dated Nov. 21, 2012.

* cited by examiner

*Primary Examiner* — Wayne Young
*Assistant Examiner* — Brian Butcher
(74) *Attorney, Agent, or Firm* — McClure, Qualey & Rodack, LLP (57) ABSTRACT

A detecting method for a touch panel includes providing a sensing matrix having a plurality of sensing units; detecting sensing data generated from the sensing unit and defining the sensing unit as a touch point or a non-touch point based on the sensing data; and grouping at least a portion of the touch points to form a touch point group, wherein projection of a touch point overlaps a projection of at least one touch point of the touch point group in one of a row direction and a column direction while adjacent to a projection in the other direction of at least one touch point of the touch point group; retrieving extreme positions of the touch point group in the row direction and the column direction; and determining a touch center position based on the extreme positions in the row direction and the column direction.

13 Claims, 9 Drawing Sheets

DETECTING METHOD FOR TOUCH PANEL

BACKGROUND OF THE INVENTION

1. Field of the Invention

This invention relates to a detecting method for a touch panel.

2. Description of the Prior Art

Flat display devices have become the mainstream in various types of display devices. For instance, the home televisions, monitors of personal computers and laptop computers, mobile phones, and display cameras are electronic products which extensively incorporate the flat display devices. As product design is driven toward user friendliness, thus display panels having touch input function are gradually becoming a key aspect in the development of flat display device industry.

Conventional touch panel technologies include resistive type, capacitive type and optical type touch panels. As for the resistive touch panels, the working principle is to determine a touch point by detecting voltage drops on the touch panel. The resistive touch panel includes two conductive layers separated by a narrow gap and a voltage difference exists between the two layers. When an object touches a point on the touch panel, the two layers become connected at that point and a conduction loop is created at the touch point. The conduction loop creates a voltage drop for the system to recognize and determine the position of touch point. However, the resistive touch panel cannot process multiple touch inputs or perform fingerprint recognition. Furthermore, the user needs to apply certain amount of pressure on the touch point to create a conduction loop, thus the resistive touch panel is subjected to the limitation of minimum applied force.

The working principles of the capacitive touch panel and the optical touch panel are different from that of the resistive touch panel, because both touch panels can process multiple touch inputs. In general, the capacitive or optical touch panel scans all sensing units of the touch panel in one frame period to obtain data and then store the data. Afterward a gradient image processing algorithm is employed to determine the number and positions of the objects touching the panel. However, the gradient image processing method is slow and requires a large amount of storage space which in turn decreases the overall system efficiency.

SUMMARY OF THE INVENTION

It is an object of the present invention to provide a detecting method for a touch panel to save the data storage space.

It is another object of the present invention to provide a detecting method for a touch panel to improve the system efficiency.

It is yet another object of the present invention to provide a detecting method for a touch panel to increase the response speed of the touch panel.

The detecting method of the present invention includes firstly providing a sensing matrix having a plurality of sensing units. When the sensing unit is touched, the sensing element of the sensing unit will detect a signal variation generated and determine the location of the sensing unit which generates the signal variation. The detecting method includes detecting sensing data generated from each of the sensing units to determine the sensing unit as a touch point or as a non-touch point. At least a portion of the touch points are grouped into a touch point group. The projection of each touch point in the touch point group is overlapping a projection of at least one of the rest touch points of the touch point group in one of a row direction or a column direction and is adjacent to a projection of at least one of the rest touch points of the touch point group in the other direction. More than one touch point groups may occur simultaneously in the sensing matrix within the same sensing period and this gives the touch panel multi-touch function.

After defining the touch point group, the detecting method then retrieves extreme positions of the touch point group in the row direction and the column direction. In other words, the detecting method will obtain locations of the touch points of at the periphery of the touch point group. Finally the detecting method will determine a touch center position based on the locations of the extreme positions.

DETAILED DESCRIPTION OF THE PREFERRED EMBODIMENT

The present invention provides a detecting method for a touch panel. In preferred embodiments, the detecting method of the present invention is applied to an optical touch panel. However, in different embodiments, the detecting method of the present invention can be applied to capacitive touch panels, inductive touch panels, resistive touch panels, or other touch panels with multi-touch function.

Figure 1:
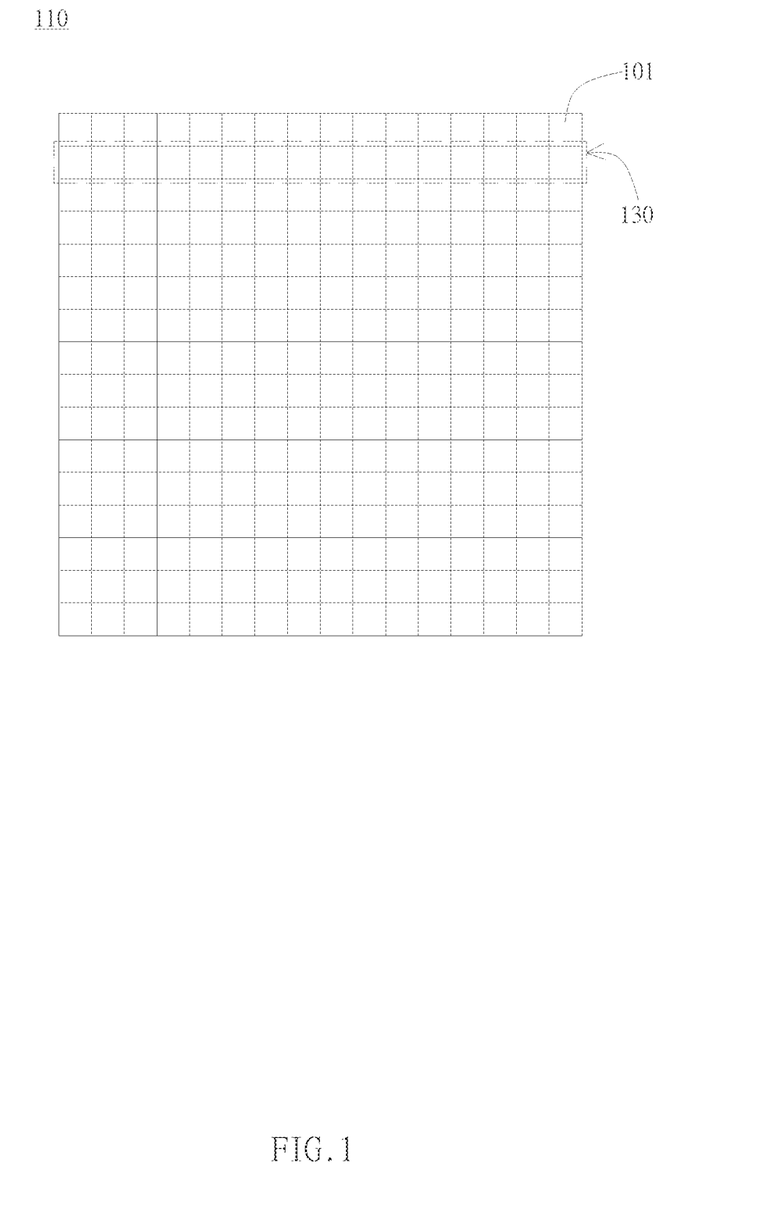
FIG. 1 is a schematic view of a touch panel of the present invention.

FIG. 1 is a schematic view of the touch panel. As FIG. 1 shows, the touch panel includes a plurality of sensing units 101. In a preferred embodiment, the sensing units 101 represent unit areas obtained by dividing the touch panel. The sensing units 101 are preferably arranged to form a sensing matrix 110, wherein the sensing matrix 110 has a plurality of parallel sensing row 130. Each of the sensing rows 130 includes a plurality of the sensing units 101 distributed in a straight line. Take a 16×16 sensing matrix 110 for instance; the sensing matrix 110 has sixteen sensing rows 130 parallel to each other. Each of the sensing rows 130 has sixteen sensing units 101. In other words, the sensing matrix 101 has 256 sensing units 101.

Figure 2:
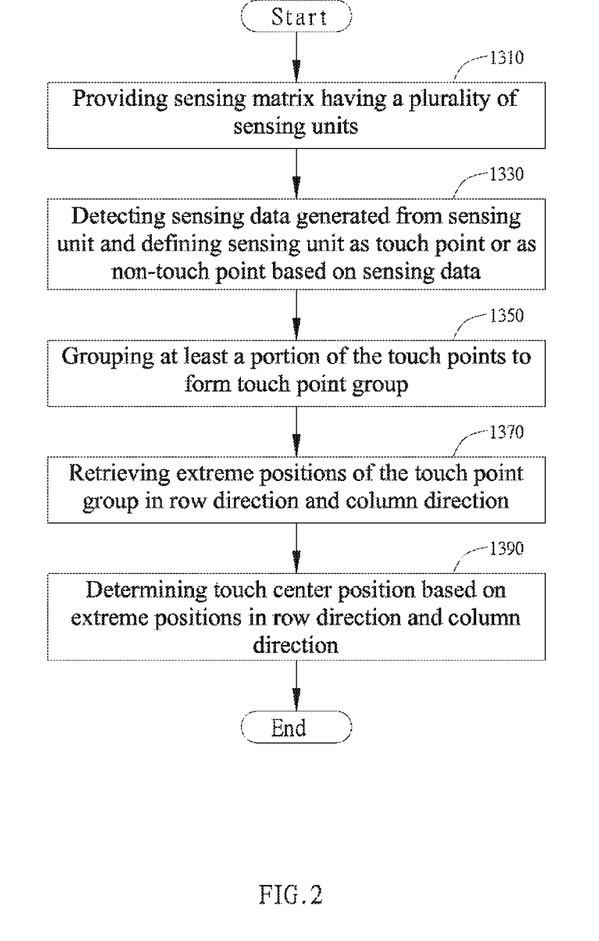
FIG. 2 is a flow chart illustrating a detecting method of the present invention.

FIG. 2 is a flow chart illustrating the detecting method of the present invention. Step 1310 includes providing a sensing matrix 110 which has a plurality of sensing units 101. The structure of the sensing matrix 110 has been explained above and thus will not be elaborated again here. When the sensing unit 101 is touched, a signal variation is created and the sensing element of the sensing unit 101 will detect the signal variation and determine the location of sensing unit 101 which generates the signal variation. Take an optical touch panel for instance, when a sensing unit 101 is touched, the optical sensing element disposed in the touch panel will determine the signal variation at the touched sensing unit 101 based on the signals received from infrared or other light beams.

Step 1330 includes detecting sensing data generated from each of the sensing units 101 to determine the sensing unit 101 as a touch point or as a non-touch point. As previously explained, each sensing unit 101 generates sensing data using the sensing element. The sensing data include electrical signals transformed from light signals or generated from the change in number of charges stored. In a preferred embodiment, the present step includes sequentially scanning the sensing rows 130 of the sensing matrix 110 in each frame period. The present step also includes scanning the sensing units 101 of each sensing row 130 to obtain sensing data generated from each sensing unit 101. Afterward the sensing data of each sensing unit 101 is compared with a pre-determined threshold value to determine the sensing unit as a touch point or as a non-touch point. In one embodiment, the above-mentioned comparison procedure is executed right after sensing data are obtained from each sensing unit 101 to save storage space, instead of after obtaining sensing data generated from all sensing units 101. Furthermore, during the comparison procedure, the sensing unit 101 whose sensing data's magnitude is greater than the threshold value is preferably determined as the touch point.

Figure 3:
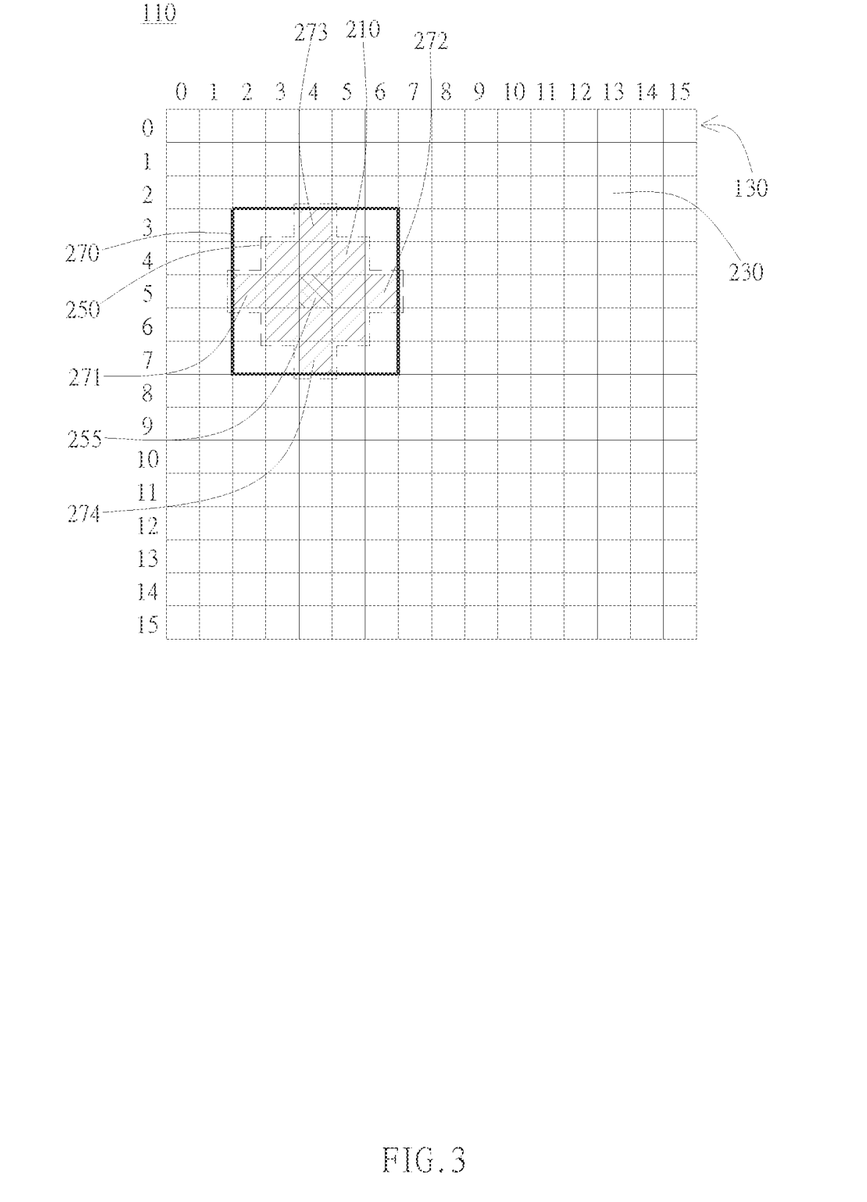
FIG. 3 is a schematic view illustrating a touch point group formed on the touch panel.
Figure 4:
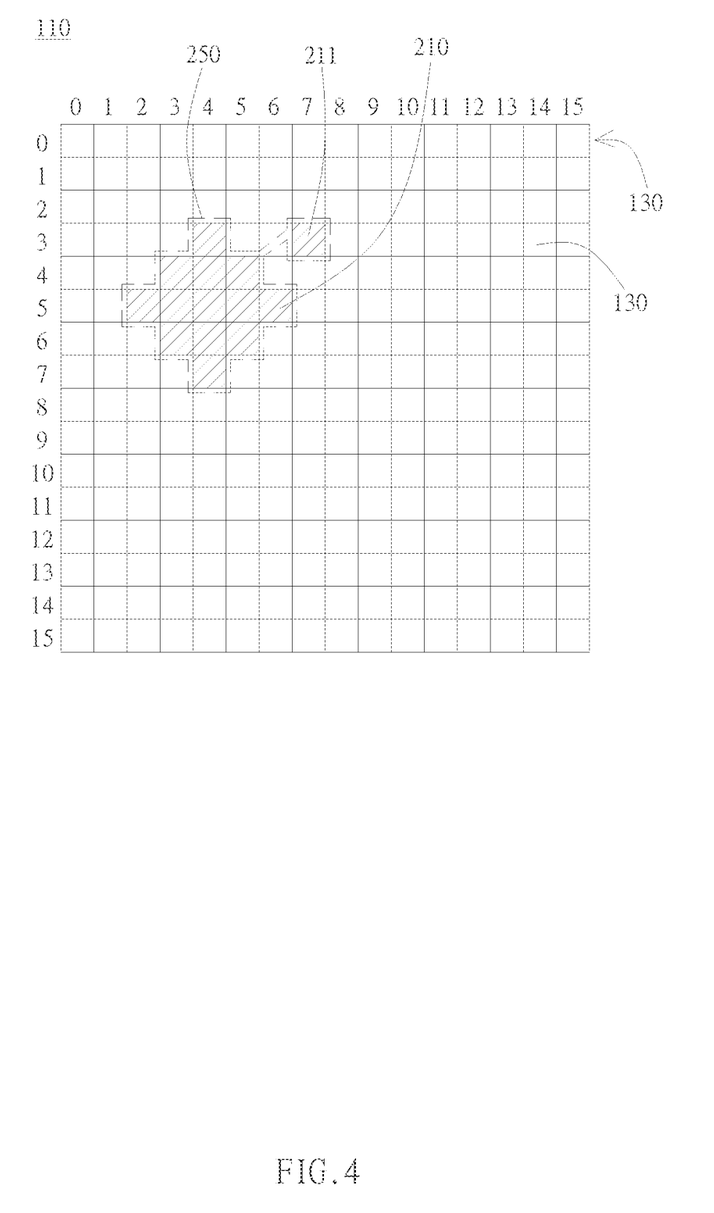
FIG. 4 is a schematic view of another embodiment in which the touch panel is touched.

Step 1350 includes grouping at least a portion of the touch points to form a touch point group. As FIG. 3 shows, the sensing units 101 in hatched lines are defined as the touch points 210 while the blank sensing units 101 in blank areas are defined as the non-touch points 230. Touch points 210 enclosed by a dotted line belong to the same touch point group 250. In the same touch point group 250, a projection of the touch point overlaps a projection of at least one of the rest touch points 210 of the touch point group 250 in a row direction or a column direction and is adjacent to a projection of at least one of the rest touch points 210 of the touch point group 250 in the other direction. In preferred embodiments, at least one side of the touch point 210 is adjacent to another touch point 210 of the same touch point group 250. However, in different embodiments, such as the one shown in FIG. 4, even when four sides of the touch point 211 is not adjacent to any touch point 210, if the projection of the touch point 211 overlaps the projection of at least one of the rest touch points 210 in one of the row direction or the column direction and is adjacent to the projection of another touch point 210 in the other direction, the touch point 211 may still be defined as belonging to the same touch point group 250. Furthermore, more than one touch point groups 250 may occur simultaneously in the sensing matrix 110 and thus give the touch panel a multi-touch function.

Step 1370 includes retrieving extreme positions of the touch point group in row direction and in column direction. In other words, the extreme positions are the positions of the touch points 210 closest to the boundary of the sensing matrix 110. In the present embodiment, the above-mentioned row direction corresponds to the extending direction of the sensing row 130 of the sensing matrix 110 while the column direction corresponds to the column of sensing matrix 110. As for the embodiment illustrated in FIG. 3, the sensing matrix 110 from left to right starts from column 0 and ends at column 15 in row direction. On the other hand, the sensing matrix 110 from top to bottom starts from row 0 and ends at row 15 in column direction. For example, the extreme positions include the leftmost, the rightmost, the highest, and the lowest positions. The left-most position of the touch point group 250 is located on column 2 while the right-most position is situated on column 6. The highest position of the touch point group 250 is situated on row 3, while the lowest position is situated on row 7.

Step 1390 includes determining a touch center position based on the extreme positions in row direction and in column direction. As for the embodiment illustrated in FIG. 3, the left-most position and the right-most position of the touch point group 250 are situated respectively on column 2 and column 6. Thus by taking the average can find that the touch center to be situated on column 4 in row direction. Similarly, the highest position and the lowest position are situated respectively on the row 3 and row 7. Thus by taking the average can find that the touch center is located on row 5 in column direction. According to the calculations above, the touch center 255 is situated at the coordinate (4, 5), i.e. column 4, row 5. However, in different embodiments, methods of calculating the touch center include other algorithms such as taking weight or other factors into account to obtain the desired results.

From another aspect of the detecting method, the step 1390 of determining the touch center can determine the touch points 210 of the touch point group 250 closest to the boundary of the sensing matrix 110 as a first reference point 271, a second reference point 272, a third reference point 273, and a fourth reference point 274. Furthermore, a touch region 270 covering the entire touch point group 250 is defined; wherein the first reference point 271, the second reference point 272, the third reference point 273 and the fourth reference point 274 are adjacent to the boundary of the touch region 270. As FIG. 3 shows, the touch region 270 is rectangular and thus the process of determining the touch center 255 is equivalent to determining the geometric center of the touch region 270 and determining the reference points 271, 272, 273, and 274. The first coordinate of the touch center 255 in row direction can be determined based on locations of the first reference point 271 and the second reference point 272. The second coordinate of the touch center 255 in column direction can be determined based on locations of the third reference point 273 and the fourth reference point 274.

The processing system can interpose an output period between two sensing periods. The sensing period represents the time required to scan through every sensing unit 101 of the sensing matrix 110 once. The next sensing period represents the time required to again scan through every sensing units 101 of the sensing matrix 110. After obtaining the touch center 255, the processing system then outputs a touch center location signal during the output period between two sensing periods based on the touch center location for the back end process.

Figure 5:
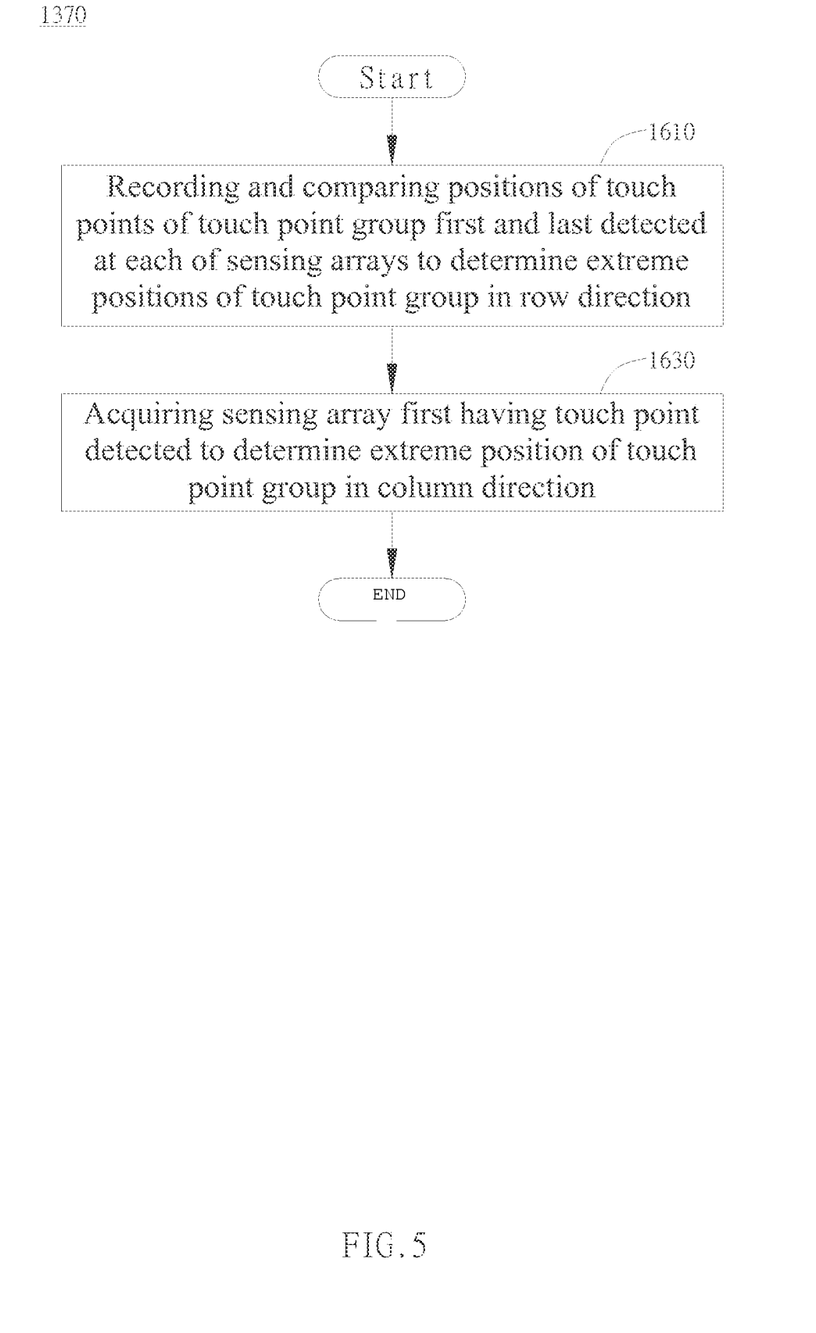
FIG. 5 is a flow chart of the detecting method of the present invention in another embodiment.

FIG. 5 illustrates a flow chart of another embodiment of the detecting method. In the present embodiment, step 1370 further includes step 1610 of recording and comparing first and last detected touch points 210 of the touch point group for each of the sensing rows 130 to determine the extreme positions of the touch point group in row direction. In other words, step 1610 includes recording positions of the first and last detected touch points 210 in each sensing row 130 and then comparing the locations of the touch points 210 of the same touch point group 250 recorded for each sensing row 130 in order to obtain the touch points 210 located on the boundary of the touch point group 250. In the present embodiment, step 1610 is accomplished by detecting the touch points 210 of the touch point group 250 having the most touch points 210 in one of the sensing rows 130 and obtaining positions of the two touch points 210 first and last detected in the sensing row 130.

As for the embodiment illustrated in FIG. 3, in the touch point group 250, the coordinate of the first detected touch point 210 in row 4 is 3 (i.e. column 3) while the coordinate of the last detected touch point 210 in row 4 is 5 (i.e. column 5). The coordinate of the first detected touch point 210 in row 5 is 2 (i.e. column 2) while the coordinate of the last detected touch point 210 in row 5 is 6 (i.e. column 6). By comparing the coordinates of touch points 210 mentioned above plus others not listed here, it can be determined that the coordinate of the extreme position on the left is 2 (i.e. column 2) and that of the extreme position on the right is 6 (i.e. column 6). After obtaining the extreme positions in row direction, the detecting method can then proceed with acquisition of the coordinate of the touch center.

In the embodiment illustrated in FIG. 5, step 1630 includes retrieving the sensing row 130 in which the touch point 210 of the touch point group 250 is first detected. The coordinate of the above-mentioned touch point 210 is then defined as the extreme position of the touch point group 250 in column direction. Step 1650 includes retrieving the first sensing row 130 detected to have no touch points 210 of the touch point group 250 and to determine the extreme position of the touch point group in the row direction. In other words, the extreme positions of the touch point group in the row direction is determined by obtaining the sensing rows 130 having the touch point 210 first detected and a sensing row 130 first detected having only non-touch points 230. In the embodiment illustrated in FIG. 3, the sensing row 130 first detected to have touch point 210 of the touch point group 250 is row 3, thus the coordinate of the extreme position at the top in column direction is 3. The sensing row 130 first detected to have no touch point 210 of the touch point group 250 is row 8. Thus row 7 is the last sensing row 130 having the touch point 210. In this way, the coordinate of the extreme position at the bottom in column direction is 7. Then after obtaining the extreme positions of the touch point group 250 in column direction, the two extreme positions can be used to obtain the coordinate of the touch center in row direction.

Figure 6A:
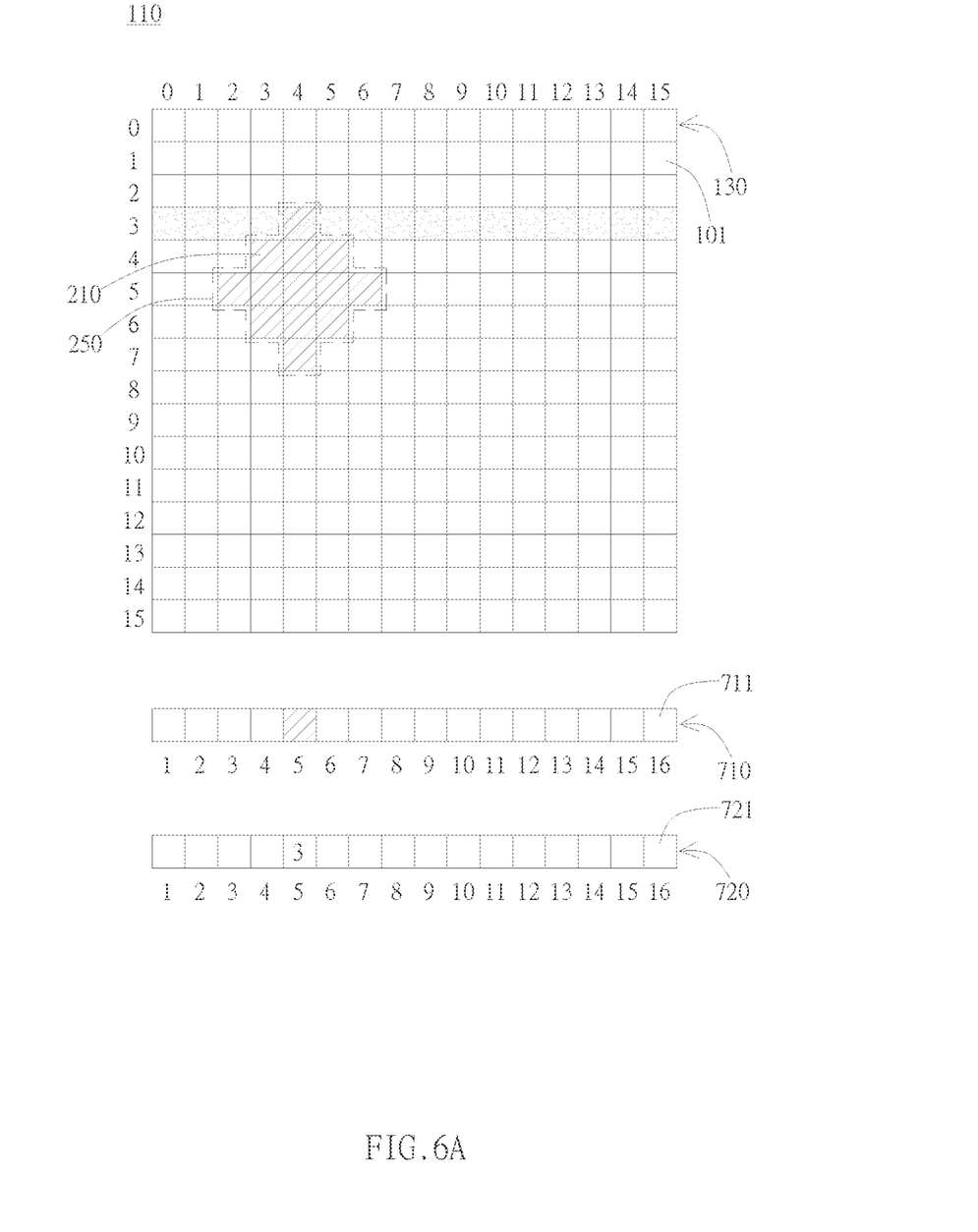
FIG. 6A is a schematic view of an embodiment in which a first memory group is in operation.

In the preferred embodiment illustrated in FIG. 6A, a first memory group 710 and a second memory group 720 are used to record data generated from every sensing row 130. The first memory group 710 has a plurality of first memory units 711 with each corresponding to one sensing unit 101 of every sensing row 130. Take FIG. 6A for instance, each sensing row 130 includes 16 sensing units 101, and correspondingly, the first memory group 710 also has 16 first memory units 711. The foremost first memory units 711 of the first memory group 710 correspond to the first sensing unit 101 of the sensing row 130. The next first memory unit 711 of the first memory group 710 corresponds to the second sensing units 101 of each sensing row 130. The rest may be deduced by analogy.

Figure 6B:
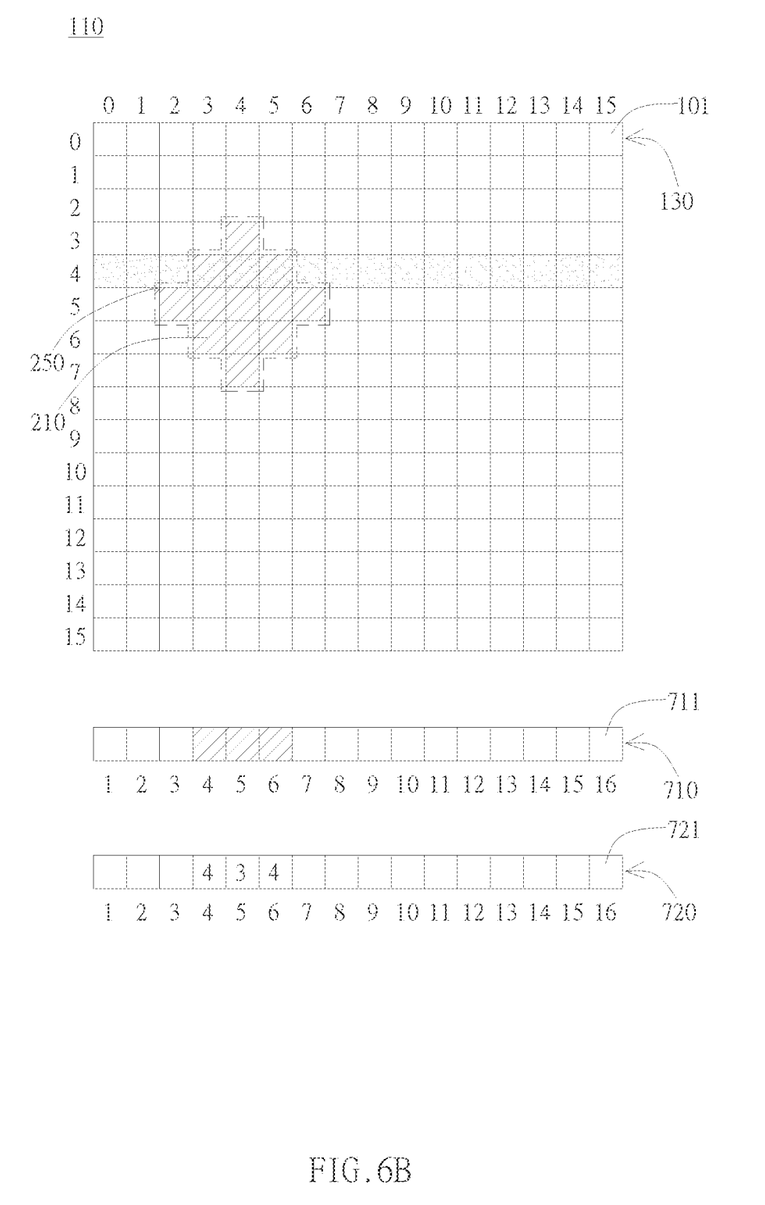
FIG. 6B is another schematic view of the embodiment illustrated in FIG. 6A, wherein the scanning is performed on a subsequent row.

When the system scans through the sensing row 130 of row 3, the system detects that the $5^{th}$ sensing unit 101 (with the column-coordinate of 4) is a touch point 210. Then the $5^{th}$ first memory unit 711 of the first memory group 710 will record the $5^{th}$ sensing unit 101 of the sensing row 130 of row 3 as a touch point 210. Afterward, when the system scans through the sensing row 130 of row 4, as shown in FIG. 6B, the system detects that the $4^{th}$, $5^{th}$ and $6^{th}$ sensing units 101 (with column-coordinate 3, 4 and 5) respectively are the touch points 210. The $4^{th}$, $5^{th}$ and $6^{th}$ first memory units 711 of the first memory group 710 will record locations of the $4^{th}$, $5^{th}$ and $6^{th}$ sensing units 101 in the sensing row 130 with row 4. The system also overwrites previous record of touch point 210 in the $5^{th}$ first memory unit 711 of the first memory group 710. As FIG. 6C shows, the same scanning process is repeated on the $5^{th}$, $6^{th}$ and $7^{th}$ sensing rows 130 to obtain a first memory group 710 having records of touch points 210 in the $2^{nd}$, $3^{rd}$, $4^{th}$, $5^{th}$ and $7^{th}$ first memory units 711.

After recording locations of the touch points 210, the system then needs to determine which touch points 211 recorded in the first memory units 711 are adjacent and belonging to the same touch point group 210. In the embodiment illustrated in FIG. 60, the $2^{nd}$ to $7^{th}$ first memory units 711 are adjacent and thus the touch points 210 recorded in those 6 first memory units 711 belong to the same touch point group 250. However, if the first memory group 710 has record of touch point 210 not adjacent to each other, such as the $10^{th}$ first memory unit 711. In that case, the system will determine that the $10^{th}$ first memory unit 711 belongs to another touch point group 250. In this way, the system has the ability to perform multi-touch recognition.

Figure 6C:
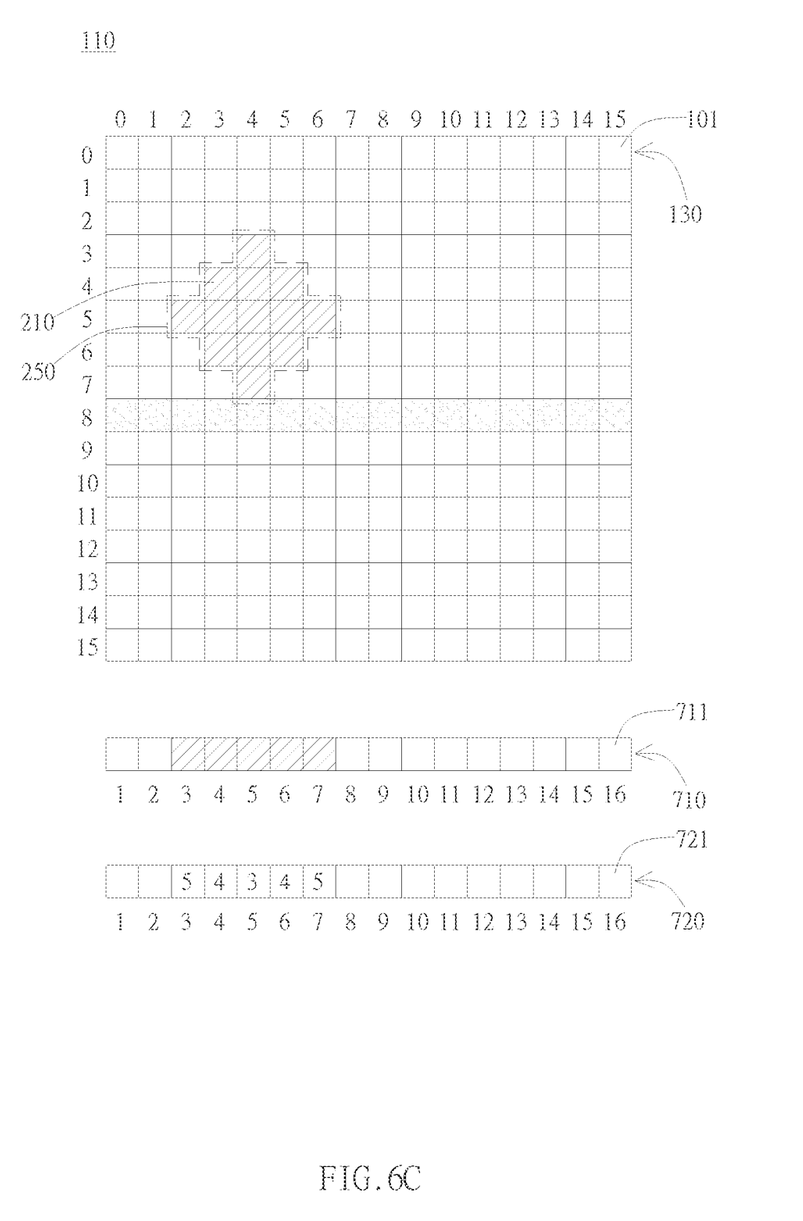
FIG. 6C is another schematic view of the embodiment illustrated in FIG. 6A, wherein the scanning is performed on the bottom row of the touch point group.

In the embodiment illustrated in FIG. 6C, the system will scan through the row 8 to have no touch point 210 belonging to the same touch point group 250. At this moment, the system determines that it has detected every touch point 211 in the touch point group 250 and then will not include more touch point 210 into the touch point group 250. As FIG. 6C shows, the $3^{rd}$ and $7^{th}$ first memory units 711 of the first memory group 710 contains records of the touch points 210 situated at two extreme ends of the touch point group 250. Thus the location of the two touch points 210 recorded in the $3^{rd}$ and $7^{th}$ first memory units 711 are used to determine the extreme positions in row direction. Furthermore, after locating the touch point group 250 and determining the extreme positions in row direction; data recorded in the first memory units 711 of the first memory group 710 can be cleared or overwritten in order to record data of another touch point group. In this way, the system is able to process data from multiple touch point groups and can thus execute multi-touch recognition.

The second memory group 720 has a plurality of second memory units 721 with each corresponding to a sensing unit 101 of each sensing row 130. In the embodiment illustrated in FIG. 6A, every sensing row 130 has 16 sensing units 101 and thus the second memory group 720 has correspondingly 16 second memory units 721. The foremost second memory units 711 of each first memory group 710 correspond to the first sensing unit 101 of the sensing row 130. The next first memory units 711 of each first memory group 710 correspond to the second sensing units 101 of each sensing row 130. The rest may be deduced by analogy.

When the system scans through row 3, the system detects that the $5^{th}$ sensing unit 101 (with column-coordinate of 4) is a touch point 210. Then the $5^{th}$ second memory unit 721 of the memory group 720 will record 3 as the value of the sensing row 130 (row 3). Afterward, when the system scans through row 4, as shown in FIG. 6B, the system detects that the $4^{th}$, $5^{th}$ and $6^{th}$ sensing units 101 (each with column-coordinate 3, 4 and 5) are also touch points 210. The $4^{th}$ and $6^{th}$ second memory units 721 of the second memory group 720 will record 4 as the value of the sensing array (row 4) while the $5^{th}$ second memory unit 721 retains the previous value of 3. As FIG. 6C shows, the same scanning process is repeated on row 5, 6 and 7 to obtain a second memory group 720 having different records of touch point 210 in the $2^{nd}$, $3^{rd}$, $4^{th}$, $5^{th}$, $6^{th}$ and $7^{th}$ first memory units 711.

In the embodiment illustrated in FIG. 60, when the system scans through row 8 which contains no touch point 210 belonging to the touch point group 250. At this moment, the system determines that it has detected every touch point 211 in the touch point group 250 and thus will not include more touch point 210 into the touch point group 250. The system will then identify 8 as the terminal sensing array value. Based on the initial sensing array value of 3 and the terminal sensing array value of 8, the extreme positions in the column direction are determined to be 3 and 7, wherein the extreme position of 7 is obtained by subtracting the terminal sensing array value of 8 by 1. Furthermore, after locating the touch point group 250 and positions of the extreme positions in the column direction; data recorded in the second memory units 721 of the second memory group 720 can be cleared or overwritten in order to record data of another touch point group. In this way, the system is able to process data from another touch point groups and perform multi-touch recognition.

Figure 7:
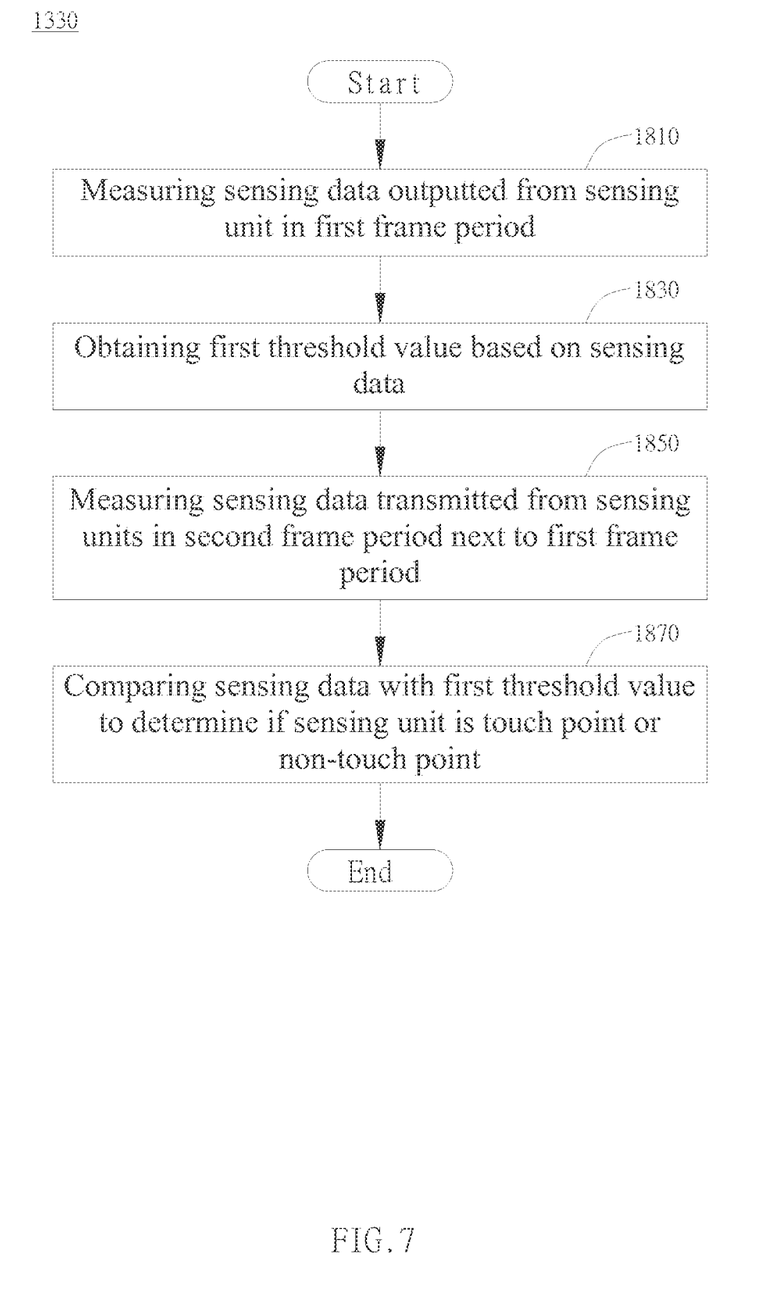
FIG. 7 is a flow chart of another embodiment of a touch sensing method.

FIG. 7 is a flow chart illustrating another embodiment of the detecting method of the present invention. As FIG. 7 shows, step 1330 includes step 1810 of measuring a sensing data transmitted from the touch point 210 in a first frame period. Generally, the system preferably scans through the sensing matrix 110 at a frequency of 60 Hz, thus each frame period represents the time required for the system to scan through every sensing row 130 of the sensing matrix 110. Step 1830 includes obtaining a first threshold value based on the sensing data. In a preferred embodiment, step 1830 takes the average of all the sensing data generated from the sensing units 210 in order to obtain the first threshold value. However, in different embodiments, sensing data generated from the sensing units 210 of individual sensing array 130 such as the first sensing array or the second sensing array can be first averaged to obtain a reference data, e.g. a first reference data or a second reference data for each sensing array. All the reference data can then be averaged to obtain the first threshold value. The above-mentioned calculation algorithm can save memory storage for storing data and improve overall system efficiency. Other than the algorithm mentioned above, algorithms also include the ones taking weight or other factors in account in order to obtain the first threshold value.

Step 1850 includes measuring the sensing data transmitted from the sensing units 101 in a second frame period after the first frame period. In other words, the second frame period is the time period during which the system again scans through the sensing matrix 110, after the first frame period. Step 1870 includes comparing the sensing data obtained during the second frame period with the first threshold value to determine if the sensing unit 101 is a touch point 210 or a non-touch point 230. In preferred embodiment, in order to save calculation time and improve system efficiency, step 1870 is executed in the first frame period right after obtaining sensing data of all sensing units 101 and not in the second frame period. Furthermore, after obtaining all the sensing data in second frame period, step 1810 and step 1830 will be repeated to obtain the second threshold value which is then used as a reference for determining touch points 210 in the consequent third frame period.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A detecting method for a touch panel, comprising:
   providing a sensing matrix having a plurality of sensing units;
   detecting a sensing data generated from the sensing unit and measuring the sensing data transmitted from the sensing unit in a first frame period and obtaining a first threshold value based on the sensing data to define the sensing unit as a touch point or as a non-touch point based on the sensing data;
   grouping at least a portion of the touch points to form a touch point group, wherein a projection of the touch point in the touch point group is overlapping a projection of at least one touch point of the touch point group in one of a row direction or a column direction and is adjacent to a projection of at least one touch point of the touch point group in the other direction;
   retrieving touch points within the touch point group having extreme positions in the row direction and the column direction respectively; and
   determining a touch center position based on the extreme positions in the row direction and the column direction.

2. The detecting method of claim 1, wherein the step of defining the sensing unit includes:
   dividing the sensing matrix into a plurality of parallel sensing arrays having the sensing units; and
   scanning sequentially the sensing data generated from the sensing units of each sensing array and defining the sensing unit as a touch point or a non-touch point based on the sensing data.

3. The detecting method of claim 2, wherein the step of retrieving extreme positions includes:
   recording and comparing positions of the touch points of the touch point group first and last detected at each of the sensing arrays to determine the extreme positions of the touch point group in the row direction;
   acquiring the sensing array first having the touch point detected to determine the extreme position of the touch point group in the column direction; and
   acquiring the sensing array having non of the touch points included in the touch point group to determine the extreme position of the touch point group in the column direction.

4. The detecting method of claim 2, wherein the step of retrieving the extreme positions includes:
   recording sequentially the positions of the touch points of the sensing array in the row direction in a plurality of first memory units of a first memory group, wherein each of the first memory units corresponds to one of the sensing units in the sensing arrays;
   recording sequentially the positions of the touch points of the next sensing array in the row direction in the first memory units of the first memory group;
   grouping the adjacent touch points with positions recorded in the first memory group into the touch point group;
   determining the extreme positions in the row direction based on positions recorded in the first memory units.

5. The detecting method of claim 4, wherein the step of retrieving the extreme positions includes:
   recording an initial sensing array value in a plurality of second memory units of a second memory group, wherein the initial sensing array value occurs after detecting the first touch point of the touch point group in each of the sensing array;
   acquiring a terminal sensing array value after scanning the sensing array not having the touch point of the touch point group; and
   determining the extreme positions of the touch point group in the row direction based on the initial sensing array and the terminal sensing array value.

6. The detecting method of claim 1, wherein the step of determining the touch center position includes the following steps:

defining a touch region based on the extreme positions of the touch point group in the row direction and the column direction of the sensing matrix, wherein at least four touch points of the touch point group are adjacent to a periphery of the touch region, the touch region has at least four reference points located at the periphery of the touch region, the reference points correspond to the touch points adjacent to the touch region, the touch region substantially covers the touch point group.

7. The detecting method of claim 6, wherein the reference points includes at least a first reference point, a second reference point, a third reference point and a fourth reference point, the step of determining the touch center position includes:
  obtaining a row center coordinate based on positions of the first reference point and the second reference point;
  obtaining a column center coordinate based on positions of the third reference point and the fourth reference point; and
  determining the touch center position based on the row center coordinate and the column center coordinate.

8. The detecting method of claim 1, wherein the step of defining the sensing unit includes:
  measuring the sensing data transmitted from the sensing units in a second frame period next to the first frame period; and
  comparing the sensing data with the first threshold value to determine if the sensing unit is a touch point or a non-touch point.

9. The detecting method of claim 8, wherein the step of defining the sensing unit further includes generating a second threshold value based on the sensing data obtained in the second frame period.

10. The detecting method of claim 8, wherein the sensing matrix includes a first row and a second row, the first row and the second row respectively includes a plurality of the sensing units, the step of obtaining the first threshold value includes:
  measuring the sensing data from the sensing units in the first row;
  obtaining a first reference data based on the sensing data from the first row;
  measuring the sensing data from the sensing units in the second row;
  obtaining a second reference data based on the sensing data from the second row; and
  obtaining the first threshold value based on the first reference data and the second reference data.

11. The detecting method of claim 1, wherein the first threshold value is an average value of the sensing data.

12. The detecting method of claim 1, including:
  defining a sensing period and an output period; and
  transmitting a touch center position signal in the output period based on the touch center position.

13. A touch detection method, including the following steps:
  providing a sensing matrix having a plurality of sensing rows, wherein each of the sensing rows includes a plurality of sensing units;
  defining the sensing unit as a touch point or a non-touch point based on a sensing data transmitted from the sensing unit;
  grouping at least a portion of the touch points to form a touch point group, wherein a projection of the touch point in the touch point group is overlapping a projection in a row direction of at least one touch point of the touch point group and is adjacent to a projection in a column direction of at least one touch point of the touch point group;
  detecting the touch points of the touch point group having the most touch points in one of the sensing rows and obtaining positions of the two touch points first and last detected in the sensing row;
  obtaining the sensing rows having the touch point first detected and a sensing row first detected to have only non-touch points;
  defining a touch region, wherein at least four of the touch points in the touch point group are adjacent to a periphery of the touch region, the touch region has at least four reference points located at the periphery of the touch region; and
  determining a touch center position based on positions of the reference points.

* * * * *